United States Patent
Achten et al.

(10) Patent No.: US 11,504,906 B2
(45) Date of Patent: Nov. 22, 2022

(54) METHOD FOR PRODUCING PRODUCTS BY MEANS OF ADDITIVE MANUFACTURING METHODS USING REACTIVE POWDERS, AND PRODUCTS THEREOF

(71) Applicant: Covestro Deutschland AG, Leverkusen (DE)

(72) Inventors: Dirk Achten, Leverkusen (DE); Thomas Buesgen, Leverkusen (DE); Thomas Faecke, Leverkusen (DE); Bettina Mettmann, Dormagen (DE); Joerg Buechner, Bergisch Gladbach (DE); Hans-Josef Laas, Odenthal (DE); Ting Liu, Cologne (DE)

(73) Assignee: Covestro Deutschland AG, Leverkusen (DE)

(*) Notice: Subject to any disclaimer, the term of this patent is extended or adjusted under 35 U.S.C. 154(b) by 121 days.

(21) Appl. No.: 16/609,247

(22) PCT Filed: May 9, 2018

(86) PCT No.: PCT/EP2018/061942
§ 371 (c)(1),
(2) Date: Oct. 29, 2019

(87) PCT Pub. No.: WO2018/206614
PCT Pub. Date: Nov. 15, 2018

(65) Prior Publication Data
US 2020/0055235 A1 Feb. 20, 2020

(30) Foreign Application Priority Data
May 9, 2017 (EP) .................................... 17170254

(51) Int. Cl.
*B29C 64/153* (2017.01)
*B33Y 70/00* (2020.01)
*B33Y 10/00* (2015.01)

(52) U.S. Cl.
CPC ............ *B29C 64/153* (2017.08); *B33Y 70/00* (2014.12); *B33Y 10/00* (2014.12)

(58) Field of Classification Search
CPC ........ B33Y 10/00; B33Y 70/00; B29C 64/153
See application file for complete search history.

(56) References Cited

U.S. PATENT DOCUMENTS

| 5,510,444 | A | 4/1996 | Halpaap et al. |
| 2016/0067917 | A1 | 3/2016 | Hirata et al. |
| 2017/0008233 | A1 | 1/2017 | Vontorcik, Jr. et al. |
| 2017/0218660 | A1* | 8/2017 | Muchna ................ E05B 65/006 |
| 2018/0134835 | A1 | 5/2018 | Laas et al. |
| 2018/0229436 | A1* | 8/2018 | Gu .......................... B29C 64/40 |
| 2019/0315062 | A1 | 10/2019 | Achten et al. |
| 2020/0010607 | A1* | 1/2020 | Hollmann ............ C08G 18/721 |

FOREIGN PATENT DOCUMENTS

| CN | 104961881 A | 10/2015 | |
| EP | 1648686 B1 | 12/2009 | |
| EP | 3028842 A1 | 6/2016 | |
| JP | H05279436 A | 10/1993 | |
| WO | 2016085914 A1 | 6/2016 | |
| WO | WO-2016085914 A1 * | 6/2016 | ......... C08G 18/5024 |
| WO | WO-2017040890 A1 * | 3/2017 | ........... B29C 64/232 |

OTHER PUBLICATIONS

Delebecq, Etienne et al., Chemical Reviews, vol. 113, No. 1, Jan. 2013, p. 80-118.
International Search Report, PCT/EP2018/061942, dated Jul. 8, 2018, Authorized officer: Luis Martins Lopes.

* cited by examiner

*Primary Examiner* — Larry W Thrower
(74) *Attorney, Agent, or Firm* — Jed C. Benson

(57) ABSTRACT

The invention relates to a method for producing a three-dimensional object by means of a powder-based additive production method from at least one first powdery material, wherein the at least one first powdery material comprises at least one first compound having a first reactive group a). The first reactive group a) is selected from the group consisting of an isocyanate group, a blocked isocyanate group, or a mixture thereof. The invention further relates to a component produced using the method according to the invention, and to powdery material that is suited for the method according to the invention.

11 Claims, No Drawings

METHOD FOR PRODUCING PRODUCTS BY MEANS OF ADDITIVE MANUFACTURING METHODS USING REACTIVE POWDERS, AND PRODUCTS THEREOF

CROSS-REFERENCE TO RELATED APPLICATION

This application is a national stage application under 35 U.S.C. § 371 of PCT/EP2018/061942, filed May 9, 2018, which claims the benefit of European Application No. 17170254, filed May 9, 2017, each of which is incorporated herein by reference.

FIELD

The invention relates to a process producing a three-dimensional object by means of a powder-based additive manufacturing method from at least one first pulverulent material, wherein the at least one first pulverulent material includes blocked and/or free NCO groups. The invention further relates to a component obtainable by the process and to a pulverulent material for use in the process of the invention.

BACKGROUND

Additive manufacturing methods use different materials and processing techniques to build up articles layer by layer. In fused deposition modeling (FDM), for example, a thermoplastic wire is liquefied and deposited onto a movable construction platform layer by layer with the aid of a nozzle. Solidification gives rise to a solid article. The nozzle and construction platform are controlled on the basis of a CAD drawing of the article. If the geometry of this article is complex, for example with geometric undercuts, support materials additionally have to be printed and removed again after completion of the article.

In addition, there exist additive manufacturing methods that use thermoplastic powders to build up articles layer by layer. In this case, by means of what is called a coater, thin layers of powder are applied and then selectively melted by means of an energy source. The surrounding powder supports the component geometry. Complex geometries can thus be manufactured more economically than in the above-described FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore the processes that are predominantly used by industrial users. Examples of powder-based additive manufacturing methods are what are called selective laser sintering (SLS) or high-speed sintering (HSS). They differ from one another in the method for introducing energy for the selective melting into the plastic. In the laser sintering method, the energy is introduced in a controlled manner via a deflected laser beam. In what is called the high-speed sintering (HSS) method (EP 1648686), the energy is introduced via infrared (IR) sources in combination with an IR absorber selectively printed into the powder bed. What is called selective heat sintering (SHS) utilizes the printing unit of a conventional thermal printer in order to selectively melt thermoplastic powders.

Nylon-12 (PA12) is the material currently most commonly used for powder-based additive manufacturing methods, for example laser sintering. PA12 is notable for high strength and toughness when it is processed by injection molding or by extrusion. A commercial PA12, for example, after injection molding has an elongation at break of more than 200%. PA12 articles that are produced by the laser sintering method, by contrast, show elongations at break around 15%. The component is brittle and therefore can no longer be regarded as a typical PA12 component. The same is true of polypropylene (PP), which is supplied in powder form for laser sintering. This material too, as a laser-sintered component, has more brittle characteristics than injection-molded PP with its typical elastomeric properties.

The elastic polymers based on block copolymers that are used in laser sintering and related powder-based additive manufacturing methods also show a profile of properties untypical of the polymers used when they are processed as powder by additive manufacturing methods to give articles. Thermoplastic elastomers (TPE) are nowadays used in laser sintering. Articles that are produced from the TPEs now available have high residual porosity after solidification, and the original strength of the TPE material is not measurable in the article manufactured therefrom. In practice, these porous components are therefore often subsequently infiltrated with liquid, hardening polymers in order to establish the profile of properties required. In spite of this additional measure, strength and elongation remain at a low level. The additional process complexity—as well as the still-inadequate mechanical properties—leads to poor economic viability of these materials.

Furthermore, thermoplastic polyurethane (TPU) is used in laser sintering and related powder-based additive manufacturing methods. The features of articles made of sintered TPU include high breaking strengths and elongations, and hence great elasticity and toughness compared, for example, to the aforementioned TPEs.

However, no components made of crosslinked polymers have been prepared to date by powder-based additive manufacturing methods that utilize selective melting. For use in applications having particular demands such as particularly good mechanical, thermal and chemical properties, there is also a need to produce crosslinked polymers with these additive manufacturing methods.

SUMMARY

It was therefore an object of the present invention to at least partly overcome at least some of the disadvantages of the prior art.

It was a further object of the invention to improve the mechanical, chemical or thermal properties of objects produced by additive methods. It was a particular object of the invention to provide a method by which articles with complex three-dimensional structure with a wide variety of different properties are producible in an efficient manner.

It was an object of the invention to provide variable profiles of properties of objects producible by means of additive methods.

DETAILED DESCRIPTION

The invention firstly relates to a process for producing a three-dimensional object by means of a powder-based additive manufacturing method from at least one first pulverulent material, wherein the at least one first pulverulent material includes at least one first compound having a first reactive group a), wherein the first reactive group a) is selected from the group consisting of an isocyanate group, a blocked isocyanate group or a mixture thereof. The first pulverulent material may additionally include at least one further compound.

Blocked isocyanate groups, frequently also called capped isocyanate groups, are especially understood to mean those that form a free isocyanate group over and above a temperature T>40° C., preferably >60° C., or preferably >80° C., or preferably >90° C., with breakdown and/or detachment of the blocking agent. The release of the isocyanate group from the blocked isocyanate group preferably takes place over a period of <24 h, or preferably <20 h, or preferably <16 h, or preferably <12 h. Preferably at least 50%, preferably at least 60%, or preferably at least 70%, of the blocked isocyanate groups form a free isocyanate group, and these preferably react at least to an extent of 30%, or preferably at least to an extent of 40%, or preferably at least to an extent of 50%, in the course of the process of the invention to give a novel compound that differs chemically from the first or further compounds in the pulverulent material from which it has formed. Suitable blocked isocyanate groups are known to the person skilled in the art from the field of polyurethane chemistry and are described by way of example in the review article by E. Delebecq, J. P. Pascault, B. Boutevin, F. Ganachaud: *On the versatility of urethane/urea bonds: reversibility, blocked isocyanate, and non-isocyanate polyurethane*; in: Chemical Reviews. volume 113, number 1, January 2013, p. 80-118 and in the journal "Farbe & Lack December 2003" on page 32 with the title "Neuen Blockierungsmitteln auf der Spur" [In Search of New Blocking Agents].

A preferred mode of blocking here is the use of solid isocyanates based on HDI, IPDI, TDI and MDI or mixtures thereof, preferably in the form of trimers, allophanates and uretdiones, with a melting point (melting point here being a synonym for a glass transition temperature of an amorphous solid or the melting point of a crystalline solid) of >40° C., or preferably of >50° C., or preferably of >60° C., or preferably of >70° C., where the isocyanate, in the form of a free isocyanate group, becomes available for a reaction only after the solid has melted.

Preferred blocked isocyanates are used in the form of allophanates or uretdiones, with at least partial cleavage of the uretdiones and/or allophanates to release free reactive isocyanate groups over and above a temperature of preferably >80° C., or preferably of >100° C., particularly in the presence of suitable, preferably basic catalysts.

Suitable blocked isocyanates are commercially available, for example, from Covestro Deutschland AG under the Desmodur®, Desmodur® BL, Desmocap® and Sumidur® BL trade names, and from Evonik Industries AG and BASF SE.

The first pulverulent material includes at least one compound having at least one reactive group a) in the form of a blocked isocyanate group, also called blocked NCO group hereinafter, and/or an isocyanate group, also called free NCO group hereinafter. The first pulverulent material preferably further includes at least one further reactive group b) that differs from the first reactive group a). The further reactive group b) is preferably an NCO-reactive group. The further reactive group b) may either be part of the first compound or part of the at least one further compound.

The additive manufacturing method may be any manufacturing method suitable for inducing reaction of the blocked or free NCO groups in the first pulverulent material during the production process. Preferably, the additive manufacturing method is a selective laser sintering (SLS) method in which the energy introduced is sufficient not just to melt the first pulverulent material but also to induce reaction of the NCO groups, so as to form new covalent bonds owing to the reaction of the NCO groups. The blocked and/or free NCO groups are referred to hereinafter as first reactive groups a).

The blocked and/or free NCO groups react preferentially during the production process with further first reactive groups a) or with at least one further reactive group b) that are preferably NCO-reactive. Preferably, the further reactive groups b) are selected from the group consisting of a hydroxyl group, an amino group, a thiol group, an epoxy group, an anhydride group, a carboxyl group, a carboxylic acid group, a carboxylate group, an ester group, a carbodiimide group, an amide group, an aldehyde group, a triazine group, a cyclic ester group, a cyclic lactam group, a cyclic carbonate group, a thiuram group or a combination of at least two of these. In the case of the reactive group b), the b) preferably represents a multitude of different reactive groups b) that are also called reactive groups b) to z) hereinafter. Preferably, a reactive group b) to z) symbolizes any further reactive group other than the first reactive group a). Preferably, the reactive group a) differs chemically from the at least one further reactive group b).

The designation of reactive group b) to z) means that there can be at least as many different reactive groups in one of the pulverulent materials, such as the first or further pulverulent material, as there are letters in the alphabet. In order to be able to distinguish these different reactive groups, they are preferably numbered in alphabetical order. Alternatively, the reactive group b) may represent a wide variety of different reactive groups.

Preferably, the production of the three-dimensional object in the production process additionally takes place by means of at least one further pulverulent material. The further pulverulent material preferably includes a further compound, preferably a polymer, that likewise has at least one reactive group. The at least one reactive group in the at least one further pulverulent material is preferably selected from the group consisting of a reactive group a), a reactive group b) to z), as described above, or from a combination of at least two of these groups. Preferably, the first pulverulent material or the at least one further pulverulent material has at least two different reactive groups a) or b) to z).

Preferably, the first pulverulent material has an average molecular mass within a range from 200 g/mol to 500 000 g/mol, or preferably from 250 g/mol to 100 000 g/mol, or preferably within a range from 300 to 50 000 g/mol. Preferably, the average molecular mass of the first pulverulent material is lower than the average molecular mass of the at least one further pulverulent material. Preferably, the average molecular mass of the first pulverulent material is less than the average molecular mass of the at least one further pulverulent material. In a preferred embodiment, the at least one further pulverulent material is a polymer by the standard definition of chemical law, according to which a polymer is a substance wherein the molecules consist of catenated monomer units.

If mention is made merely of the polymer hereinafter, the statements apply both to the first pulverulent material and to every further pulverulent material according to the definition. All further details that are given hereinafter in connection with preferred embodiments for the first pulverulent material and the at least one further pulverulent material are also applicable to all combinations of preferred embodiments.

In a preferred configuration of the process of the invention, the process includes at least the steps of:

i. providing at least the first pulverulent material on at least part of a surface, where at least the first pulverulent material includes at least one first compound that includes at least one first reactive group a) and optionally at least one further reactive group b); where the first reactive group a) is selected from the group consisting of an isocyanate group, a blocked isocyanate group or a mixture thereof;

ii. optionally treating at least part of the first pulverulent material;

iii. optionally applying a further pulverulent material, where the further pulverulent material includes a further compound, where the further compound optionally includes a reactive group a) and/or optionally at least one further reactive group b);

iv. treating at least part of the pulverulent material applied in step i. and/or in step iii.;

v. repeating steps i. to iv. at least three times with the first pulverulent material and/or the further pulverulent material to obtain the three-dimensional object;

vi. optionally thermally or chemically aftertreating the object obtained;

wherein, in the treatment in step ii. and optionally in step iv., in the treated part of the first and of any further pulverulent material, at least some of the reactive groups a) and optionally b) react among one another and/or with one another to obtain a final material.

Preferably, in the treatment in step ii. and optionally in step iv., in the treated part of the first or of the further pulverulent material, at least some of the reactive groups a) and optionally b) react among one another and/or with one another to obtain a final material. Preferably, the final material has a modulus of elasticity at least 0.01 MPa higher compared to the modulus of elasticity of the respective untreated pulverulent material.

Preferably, the final material has an increase in the modulus of elasticity within a range from 0.01 MPa to 10 GPa, or preferably within a range from 0.5 MPa to 5 GPa, or preferably within a range from 1 MPa to 2 GPa, or preferably within a range from 10 MPa to 1 GPa, or preferably within a range from 15 MPa to 0.5 GPa, in each case compared to the modulus of elasticity of the pulverulent material from step i. or optionally from step iii. Modulus of elasticity is determined to EN ISO 527-1 (last edition from April 1996, current ISO version February 2012). If a further pulverulent material having reactive groups a) and/or b) is used in step iii., this further pulverulent material is likewise treated in step iv. and as a result preferably undergoes a change in modulus of elasticity within the same range as described above for the first pulverulent material.

Preferably, the final material has a melt viscosity higher than the melt viscosity of the respective pulverulent material by more than 100 mPas, or preferably by more than 500 mPas, or preferably by 1000 mPas, measured at a shear rate of 1/s and at a temperature at least 10° C. higher than the melting temperature of the highest-melting component.

To measure the altered melt viscosity, sintered plaques of thickness 1 mm are examined for their viscosity and their storage modulus in a rheometer (TA Instruments ARES) in oscillation. Melt viscosity was determined by viscometry measurement in the melt with a plate/plate oscillation viscometer to ISO 6721-10. The measurement frequency was 1 Hz; the measurement temperature was 170° C.

Further preferably, prior to step ii., a third pulverulent material including a third compound, preferably a polymer having no reactive groups that can react with the reactive groups of the first pulverulent material, is applied to the first pulverulent material.

Preferably, the further pulverulent material likewise includes at least one further compound in the form of a polymer having at least one first reactive group a) and/or at least one further reactive group b). Preferably, the first or further pulverulent material includes at least one first polymer having at least one reactive group a) and at least one further polymer having at least one reactive group b). Preferably, the first or further pulverulent material includes at least one polymer having exclusively reactive groups a) and at least one further polymer having exclusively reactive groups b), where the reactive groups a) and b) differ chemically from one another.

When at least two different pulverulent materials are used to form the three-dimensional object of the invention, the first pulverulent material differs from the at least one further pulverulent material preferably on the basis of its different average molecular mass of the main polymer used in the respective pulverulent material. Alternatively or additionally, the first pulverulent material differs from the at least one further pulverulent material on the basis of the type or number of reactive groups a) or b) present per polymer molecule, where b) can represent a multitude of different reactive groups b) to z). This multitude of different reactive groups is reflected hereinafter by the wording "b) to z)". At the same time, however, there is no intention to limit the number of different reactive groups to the number of letters.

Preferably, the treatment in step ii. and optionally in step iv. includes action of energy on a selected part of the layer of pulverulent material applied in step i. and optionally in step iii., in accordance with a first selected cross section of the three-dimensional object. Preferably, at least some of the pulverulent material is melted during the treatment in step ii. and optionally in step iv. If the layer of the first pulverulent material applied in step i. or optionally of the further pulverulent material includes at least one further polymer, for example the second polymer, preference is given to melting both some of the first pulverulent material or optionally of the second pulverulent material together with the further polymer in the treatment in step ii. and optionally in step iv. Preferably, the melts of both of the at least two molten polymers come into contact. Preferably, the melting temperature and/or the glass transition temperature of the first polymer of the first pulverulent material are in a range that differs from the melting temperature and/or glass transition temperature of the second polymer or further polymer of the first pulverulent material by not more than 1 to 150° C., or preferably not more than 2 to 100° C., or preferably not more than 3 to 70° C., or preferably not more than 4 to 50° C. The same preferably applies to the first and all further polymers in the at least one further pulverulent material.

The polymers of the pulverulent materials can be melted, for example, by means of deflectable lasers, the melting corresponding to a selected cross section of the object to be produced. Further preferred options for the melting are known from the prior art and are specified, for example, in the EP application having application number EP16199955.2. The respective cross section is appropriately selected by a CAD program with which a model of the article to be produced has been created. This operation is also referred to as "slicing" and serves as the basis for the control of the treatment, for example in the form of irradiation by means of the laser mentioned above by way of example.

Preferably, at least one of the pulverulent materials, especially the first pulverulent material, during the treatment in step ii. and optionally in step iv., undergoes a change in viscosity in the melt within a range of >10% or preferably within a range of >20%, or preferably within a range of >30%, based on the viscosity in the melt of the first pulverulent material prior to the treatment in step ii., measured at a temperature of 10° C. above the melting temperature of the untreated pulverulent material.

Preferably, the viscosity of the molten pulverulent material, especially of the first pulverulent material, during and/or after the treatment in step ii. and optionally in step iv., is increased by more than 35%, or preferably by more than 50%, or by more than 70%, based on the viscosity of the respective pulverulent material prior to the treatment in step ii. or iv., measured at a temperature of 10° C. above the melting temperature of the untreated pulverulent material.

Preferably, the storage modulus G' of the final material in the melt, after treatment in step ii., exceeds the loss modulus G" by at least 1%, or preferably by at least 5%, or preferably by at least 10%, or preferably by at least 20%.

Preferably, at least one of the polymers of the first pulverulent material or of one of the at least one further pulverulent material also has a magnitude of complex viscosity $|\eta^*|$ (determined by viscometry measurement in the melt with a plate/plate oscillation viscometer according to ISO 6721-10 at 200° C. and a shear rate of 1/s) of $\geq 10$ mPas to $\leq 10\,000\,000$ mPas. Preferably, $|\eta^*| \geq 50$ mPas to $\leq 5\,000\,000$ mPas, or preferably $\geq 100$ mPas to $\leq 1\,000\,000$ mPas.

The magnitude of the complex viscosity $|\eta^*|$ describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}.$$

In a preferred configuration of the process, in the treatment in steps ii. and/or iv., the G' modulus of at least one of the pulverulent materials treated increases by at least 100%, preferably by at least 500%, or preferably by at least 1000%, compared to the G' modulus of the respectively untreated pulverulent material in the melt.

Preferably, in the treatment in steps ii. and/or iv., there is reaction of at least 10%, preferably at least 20%, or preferably at least 30%, or preferably at least 50%, of the isocyanate groups of the first and/or further pulverulent material.

In the reacting of the at least a portion of the reactive groups a) and optionally b) to obtain the final material, there is preferably an increase in the molecular mass of the respective reacting polymer by at least 200 g/mol, or preferably by at least 500 g/mol, or preferably by at least 1000 g/mol, or preferably by at least 5000 g/mol, based in each case on the molecular mass of the respective polymer involved in the reaction, such as the first polymer or the respective further polymer in the first or further pulverulent material having reactive groups.

In addition, it is possible that the reactive groups a) and/or b) react and crosslink with a material from the ambient atmosphere—for example water from the ambient humidity. Crosslinking is understood to mean either an increase in the molecular mass of the starting materials, i.e. of the first or further polymer, or an increase in the G' modulus, measured in the melt, to a value higher than the G' modulus of the untreated, i.e. uncrosslinked, pulverulent material.

As well as the reactive groups a) and/or b) that react with one another, the pulverulent material may also include further reactive groups c) to z) which differ chemically from the groups a) and b) and either also react with a) and/or b) or enter into another reaction among one another or else do not enter into any reaction.

The first pulverulent material or the further pulverulent material may include more than one polymer. Reference is made hereinafter to a polymer mixture when the respective pulverulent material includes more than one polymer. Preferably, the polymer or polymer mixture of the first pulverulent material has an average molecular mass within a range from 500 g/mol to 1 000 000 g/mol, or preferably from 1000 g/mol to 500 000 g/mol, or preferably within a range from 5000 to 50 000 g/mol. Preferably, the polymer or polymer mixture of the further pulverulent material has an average molecular mass within a range from 1000 g/mol to 5 000 000 g/mol, or preferably from 2000 g/mol to 1 000 000 g/mol, or preferably within a range from 8000 to 100 000 g/mol.

The at least one first pulverulent material or the at least one further pulverulent material can be applied in step i. or in step iii. by any method that enables areal or point application of the respective pulverulent material on a surface.

If reference is made hereinafter solely to the pulverulent material, the statements made with regard to the pulverulent material are applicable both to the first pulverulent material and to the at least one further pulverulent material, unless the first or further pulverulent material is named explicitly. Preferably, the pulverulent material, i.e. both the first and the further pulverulent material, is applied by a method selected from the group consisting of rolling, spraying, printing, trickling, painting, knife-coating, pouring, stamping, screen-printing or a combination of at least two of these. For the application of the pulverulent material, it is possible with preference to use instruments selected from the group consisting of a printer, a reservoir vessel, a spray nozzle, a brush, a roller, a transfer film, a roll or a combination of at least two of these, also referred to hereinafter as instrument for application. The application of the pulverulent material in step i. or iii. preferably results in a two-dimensional layer of the pulverulent material applied on the surface. Owing to the treatment of at least some of the pulverulent material of the single layer of pulverulent material in step ii. and optionally in step iv., a coherent layer of the three-dimensional object consisting of the final material of the respective layer is preferably formed. A coherent layer is also understood to mean a layer that only partly contains the final material, where preferably at least some of the final material is in coherent form. The treatment in step ii. and optionally in step iv. also results in a bond between the individual layers. The bonding can be effected via physical or chemical bonds.

Preferably, during the treatment in step ii. and optionally iv., there is reaction in each case only of some of the reactive groups a) and optionally b) or b) to z), where solely b) hereinafter can represent different reactive groups. There is preferably reaction of 1% to 99% by weight of the reactive groups a) and, if present, 1% to 99% by weight of the reactive groups b). During the treatment in step ii. and optionally iv., there is preferably also reaction in each case of 5% to 95% by weight, or preferably 10% to 90% by weight, or preferably within a range from 20% to 80% by weight, of the reactive groups a) and, if present, the reactive groups b). Preferably, reactive groups a) and optionally b) from the provided layer in step i) that remain after application of a further pulverulent material in step iii. react with at least some of the reactive groups a) and optionally b) from the layer provided in step iii) in the treatment in step iv. among one another and/or with one another. This affords a final material that chemically bonds the layers to one another. Preferably, the chemical bonds between the layers lead to different mechanical properties, primarily in the direction at right angles to the construction direction of the resulting three-dimensional object, compared to the mechanical properties without these chemical bonds between the different layers of the three-dimensional object.

Alternatively or alternatingly, the pulverulent material may also be applied to the surface in a spatially resolved manner. The pulverulent material may include more than one pulverulent material within one layer or from layer to layer. Preferably, the first pulverulent material or the further pulverulent material includes at least two different polymers, i.e. at least the first polymer and a further polymer, for example the second polymer. The first polymer differs from the respective further polymer at least in one parameter. The parameter is preferably selected from the group consisting of the number of identical reactive groups a) and/or b) to z), the configuration of the reactive groups a) and/or b) to z), the molecular masses, the melting temperature or the glass transition temperature, or a combination of at least two of these.

In a preferred embodiment of the process, the first pulverulent material or the further pulverulent material includes powder particles including at least two different polymers. Preferably, the two polymers are selected from the group consisting of the first polymer plus the second polymer, the first polymer plus a first further polymer, the first further polymer plus a second further polymer, or a combination of at least two of these. Preferably, the first pulverulent material or the further pulverulent material has a number of different polymers within a range from 2 to 20, or preferably within a range from 2 to 10, or preferably within a range from 2 to 5.

If the first pulverulent material or the further pulverulent material includes at least two different polymers, the powder particles of the first pulverulent material or the further pulverulent material preferably include at least two different types of particle, each of which includes one of the polymers. Preferably, the individual powder particle has a first particle grain that includes the first polymer and multiple further particle grains that include the further polymer, where the multiple further particle grains are preferably disposed on the surface of the first particle grain. The multiple further particle grains preferably adhere to the surface of the first particle grain owing to adhesive forces or owing to electrostatic forces. Preferably, a powder particle of the respective pulverulent material has a weight ratio of the first polymer to the at least one further polymer within a range from 10:1 to 1:100, or preferably within a range from 5:1 to 1:50, or preferably within a range from 2:1 to 1:10.

Preferably, at least one of the at least two polymers in the powder particle is melted during the treatment in step ii. Preferably, the at least one further polymer dissolves at least partly in the melt of the first polymer. By virtue of the at least partial dissolution of the at least one further polymer in the melt of the at least one first molten polymer, in a preferred embodiment, a mixture of the at least two different polymers which is virtually homogeneous at least at the particle surface is achieved without needing to melt more than one of the at least two polymers. By virtue of the homogeneous mixture, it is possible for reactive groups of the molten polymer to react together with those of the at least one further polymer in step ii. and optionally in step iv. without any need to melt both polymers. Alternatively, it is preferable that both polymers are melted in the treatment in step ii. and optionally in step iv.

Preferably, the exposure parameters for the production process for production of the three-dimensional object are chosen such that
  the first pulverulent material melts on heating in step ii. and/or iv., but the at least one further pulverulent material does not;
  the unmolten pulverulent material dissolves in the melt of the molten material;
  all pulverulent materials melt in step ii. and/or iv.

In a preferred embodiment, the pulverulent materials have different melting points that differ at least by 1° C., preferably at least 4° C. and more preferably at least 10° C.

If at least one of the pulverulent materials, for example the first pulverulent material or the further pulverulent material, includes at least two polymers having at least two different reactive groups selected from a) to z) or a different content of reactive groups selected from a) to z), it is preferable that virtually every powder particle includes at least two of the at least two polymers. Alternatively or additionally, it is preferable that at least one of the pulverulent materials includes just one kind of polymer per powder particle. The particles of all pulverulent materials that are used for construction of the three-dimensional object of the invention preferably have an average particle size within a range from 0.1 to 1000 μm, or preferably within a range from 1 to 700 μm, or preferably within a range from 2 to 500 μm. The particle size distributions are ascertained, for example, by microscopic means by counting methods or by dynamic light scattering. Preferably, the particle size distributions are ascertained by light scattering. If the pulverulent material includes more than one polymer, preferably each powder particle of the pulverulent material includes a particle grain including the first polymer surrounded by smaller particle grains of the at least one further polymer. The size ratios of the particle grain of the first pulverulent material to the particle grains of the at least one particle grains of the at least one further pulverulent material is preferably within a range from 100:1 to 1:1, or preferably within a range from 70:1 to 2:1, or preferably within a range from 50:1 to 3:1.

In a further preferred embodiment, the first pulverulent material comprises exclusively the first polymer. Further preferably, a further pulverulent material, for example a third pulverulent material, comprises exclusively a third polymer that differs from the first polymer at least by its nature or number of reactive selected from group a) to z).

In step i. and optionally in step iii., the pulverulent material is preferably applied to the surface in a spatially resolved manner. Preferably, the spatially resolved application of the pulverulent material takes place with the aid of a measure selected from the group consisting of a controlled arrangement of the instrument for application of the pulverulent material, one or more masks or templates, a printhead movable relative to the surface to be coated, a surface movable relative to the instrument for application, by transfer of a powder layer by a die or a foil, by spatially resolved electrostatic binding of the powder, by arrangement of multiple chambers containing different pulverulent materials above the surface, or a combination of at least two of these. Preferably, the resolution of the spatial resolution is in the region of the average particle size of the pulverulent material. Further preferably, the resolution of the spatial resolution of the application of the pulverulent material is in the range from 0.01 mm to 2 cm, or preferably within a range from 0.05 mm to 1 cm, or preferably within a range from 0.1 mm to 5 mm. Preferably, the pulverulent material, in the case of the spatially resolved application in step i. and optionally in step iii. as well, is converted to a coherent layer of final material by the treatment in step ii. and optionally in step iv.

Preferably, the process of the invention, after steps i. and ii. or optionally steps iv. and v., has the following further steps:

I) contacting the portion of pulverulent material treated in step i. and optionally in step iii. with a carrier, such that the at least one treated pulverulent material is bonded to the carrier;

II) removing the carrier including the at least one material joined to the carrier from the substrate;

III) applying a further layer of pulverulent material selected from the group consisting of the first pulverulent material, the second pulverulent material, a first further pulverulent material, a further pulverulent material or a mixture of at least two of these to the surface;

IV) irradiating a selected portion of the layer applied in step III) corresponding to a further selected cross section of the object with an energy beam or a plurality of energy beams such that the particles of the pulverulent material in the selected portion are at least partly melted and at least one at least partly melted volume is obtained;

V) contacting the at least one volume obtained in step IV) with the carrier or a volume previously joined to the carrier or volumes previously joined to the carrier such that the volume obtained in step IV) is joined to at least one of the volumes previously joined to the carrier or the carrier;

VI) removing the carrier including volumes joined to the carrier from the substrate;

VII) repeating steps III) to VI) until the article has been formed.

The carrier may be formed from any material that the person skilled in the art would select for the purpose in order to be able to bind the treated pulverulent material thereto. Preferably, the carrier includes a contact surface having higher adhesion to the treated pulverulent material than the surface on which the pulverulent material is provided.

The surface is preferably either the surface of a platform or of a foil on or above which the three-dimensional object is to be produced or a layer of the untreated pulverulent material or an already applied and treated layer after step ii. or optionally step iv. to which pulverulent material is applied again in step iii. or optionally step v. Preferably, the platform is a constituent of a construction space in which the three-dimensional object is to be formed. The construction space is preferably part of a machine selected from the group consisting of devices that work by the selective laser sintering method—for example from manufacturers such as EOS, Farsoon, 3D Systems or Sharebot—or by the high-speed sintering method—for example the Multi Jet Fusion method of HP.

The surface to which the first layer of the first pulverulent material is applied may be any surface that the person skilled in the art would select as surface for the purpose. Preferably, the material of the surface is selected from the group consisting of metal, ceramic, glass, plastic, textile, leather, wood or a combination of at least two of these. The metal is preferably selected from the group consisting of iron, steel, aluminum, titanium, copper, silicon or a combination of at least two of these. The plastic may be any plastic that the person skilled in the art would use for the purpose.

The plastic is preferably selected from the group consisting of polyetheretherketone (PEEK), polyetheramideketone (PEAK), polyimide (PI), Teflon, silicone, silicone rubber, fluoro rubber, fluorosilicone rubber, or other preferably high-melting thermoplastics or heat-resistant thermosets and mixtures of at least two of these. The surface has preferably been upgraded by means of standard methods in order to achieve specific desired surface tensions, adhesions and thermal/chemical stability, and thermal conductivities. If step i. and optionally step iii. involves applying a pulverulent material that has been applied to a layer of pulverulent material applied beforehand and optionally treated in step ii. or optionally in step iv., this layer applied beforehand constitutes the surface for the pulverulent material that is applied in the repeat steps v. In other words, the final material of every pulverulent material applied in steps i. or optionally in steps iii. and treated in steps ii. or optionally steps iv. constitutes the surface for the respective following layer. However, it is also possible that the final material of any layer applied constitutes the surface for application of a further layer of pulverulent material in a repeat step v., between which at least one further layer of pulverulent material has been applied at least in part. It is also possible that pulverulent material is applied in step i. or optionally iii. to parts of surfaces of different layers beneath.

The portion of the surface which is covered with the pulverulent material by the applying in step i. and optionally in step iii. of the pulverulent material, whether it be the first or one of the at least one further pulverulent materials, is preferably within a range from 1% to 100%, or within a range from 5% to 95%, or preferably within a range from 10% to 90%, based on the total surface area of the surface. The determination or calculation of the total surface area of the surface is made from the portion of the surface area accessible to the pulverulent material. If, for example, part of the surface of the surface to be coated is outside the construction space or is covered by other layers, this part is not included in the total surface area of the surface. In addition, the respective final material has a total surface area much smaller than the total surface area of the pulverulent material applied for production thereof. Thus, the total surface area of the respective final material includes only the portion of the resultant surface that is not in contact with a layer beneath, alongside or above it. Preferably, all parts of the surface of the final material that are not in contact with final material of a further layer constitute the total surface area of the respective final material.

Preferably, the surface to which pulverulent material is applied in step i. has a total surface area within a range from 0.01 to 1000 $m^2$, or preferably within a range from 0.02 to 500 $m^2$, or preferably within a range from 0.05 to 100 $m^2$.

The treatment may be any treatment of the pulverulent material that has the effect of forming at least some of the pulverulent material to give the respective final material and ultimately to give the three-dimensional object. Preferably, the treatment is selected from the group consisting of a treatment by heat, a treatment by electromagnetic radiation, preferably by infrared radiation, a treatment by an electron beam, a treatment by pressure or a combination of at least two of these.

At least part of the process, but at least the treatment in step ii. or iv., is preferably effected in a construction space having a temperature within a range from 20 to 350° C., or preferably within a range from 25 to 300° C., or preferably within a range from 30 to 250° C., or preferably within a range from 40 to 200° C. The construction space may be any space that enables processing of the pulverulent material to give the final material or to give the three-dimensional object. The introduction of the pulverulent material into the heated or unheated construction space is preferably not part of the treatment in step ii. or iv. Preferably, the temperature of the construction space is below the melting temperature or the softening temperature of at least one of the polymers included in the pulverulent materials.

Preferably, the construction space has the surface to which the pulverulent material is applied in step i. or iii. Preferably, the construction space has walls around the surface that serves as boundary for the pulverulent material in the applying of the material in step i. or iii. Preferably, the pulverulent material(s) is/are still pulverulent at the construction space temperature. During the treatment, the pulverulent material is melted. Preferably, the pulverulent material, during the treatment in step ii., is brought to a temperature within a range from 1 to 200° C., or preferably within a range from 5 to 180° C., or preferably within a range from 10 to 160° C., or preferably within a range from 15 to 150° C., or preferably within a range from 20 to 120° C., above the softening temperature or melting temperature of the pulverulent material. Preferably, the molten pulverulent material has a magnitude of complex viscosity $|\eta^*|$ (determined by viscometry measurement in the melt with a plate/plate oscillation viscometer to ISO 6721-10 and a shear rate of 1/s) within a range from $\geq 10$ mPa·s to $\leq 10\,000\,000$ mPa·s, or preferably within a range from 50 mPa·s to 5 000 000 mPas, or preferably within a range from 100 mPas to 1 000 000 mPas, or preferably within a range from 500 mPas to 100 000 mPas.

The heat treatment is preferably effected by the irradiation of the pulverulent material by means of an energy beam. The irradiation of a selected portion of the layer, corresponding to a cross section of the three-dimensional object to be formed, preferably takes place with an energy beam, such that the pulverulent particles in the selected portion are bonded. This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 µm. The laser may take the form of a semiconductor laser or of a gas laser. An electron beam is also conceivable. The bonding of the particles in the irradiated portion of the particle layer is typically effected through (partial) melting of a (semi) crystalline material and bonding of the material in the course of cooling. Alternatively, it is possible that other transformations of the particles such as a glass transition, i.e. the heating of the material to a temperature above the glass transition temperature, bring about bonding of the particles to one another. The energy source preferably emits light within a wavelength range from 200 to 2000 nm, or preferably within a wavelength range from 130 to 1900 nm, or preferably within a wavelength range from 160 to 1800 nm. On melting of pulverulent material, an at least partly molten volume is obtained. The term "molten volume" is used here without further differentiation for every layer of pulverulent material.

As well as the melting and bonding of the pulverulent particles to give the molten volume in the form of the SLS method, it is additionally an aim of the treatment or treating in steps ii. and optionally iv. to generate a reaction, especially a chemical reaction, between at least two identical or two different groups of the at least two reactive groups a) and/or b) of the first and/or further polymer in the pulverulent materials. It is preferably owing to this reaction that the increase in the modulus of elasticity in the treated material that constitutes the final material in comparison to the pulverulent material prior to the treatment in step ii. or iv. takes place. Preferably, the treatment in step ii. and optionally in step iv. converts the pulverulent material at the treatment sites to a coherent final material, where the final materials formed in the repeat steps v. are in contact with one another such that they form the three-dimensional object after performance of the last repeat step v. The three-dimensional object is preferably in one-piece form. However, it is also conceivable that, in the repetition of steps i. and ii., at least two parts of the three-dimensional object that are not bonded to one another are formed, and these can be joined to one another, for example, in a further step iv. to give the three-dimensional object, or multiple individual three-dimensional objects form in one construction process.

Preferably, the final material has various segments with different material properties. Preferably, the final material has at least two different homogeneous material segments in regular distribution that preferably repeat within a range from 2 to 100 000 000 times, or preferably within a range from 10 to 10 000 000 times, or preferably within a range from 100 to 1 000 000 times, or preferably within a range from 1000 to 100 000 times. The segments preferably have a size within a range from 5 nm$^3$ to 10 cm$^3$, or preferably within a range from 10 nm$^3$ to 1 cm$^3$, or preferably within a range from 100 nm$^3$ to 0.5 cm$^3$. This homogeneous distribution of chemically inhomogeneous or different material segments can be utilized in a controlled manner to adjust impact resistance and modulus within the three-dimensional object.

Preferably, the average glass transition temperature Tg of the final material obtained is more than 1° C., or preferably more than 3° C., or preferably more than 5° C., higher than the averaged Tg of the use components in the form of the respective pulverulent materials or the respective polymer present in the pulverulent materials.

Preferably, the degree of crystallization of the final material is lower than the degree of crystallization of the starting components in the form of the respective pulverulent material or polymers present therein. Preferably, the degree of crystallization of the final material is reduced by <1%, or preferably by <3%, or preferably by <5%, based on the degree of crystallization of the respective pulverulent material from which the final material has been formed. The degree of crystallization, with knowledge of the enthalpy of fusion of a material, can be determined from the area beneath the fusion curve in a DSC (differential scanning calorimetry) analysis. A means of determining DSC fusion curves is by Dr. Markus Schubnell in the publication to be found at https://de.mt.com/dam/mt_ext_files/Editorial/Simple/0/polymere_kristallinitaetdsctausercom13ds1213.pdf in UserCom January 2001. It is a feature of the product of the invention that the area beneath the fusion curve becomes measurably smaller compared to the starting materials.

The final material preferably has a content of reactive groups a) to z) within a range from 0.1 to 80 mol %, or preferably within a range from 1 to 60 mol %, or preferably within a range from 2 to 50 mol %, or preferably within a range from 5 to 40 mol %, based on the molar amount of the reactive groups a) to z) in the respective pulverulent material prior to the treatment. The final material preferably has a content of reactive groups a) within a range from 0.1 to 60 mol %, or preferably within a range from 0.2 to 50 mol %, or preferably within a range from 0.5 to 40 mol %, or preferably within a range from 1 to 30 mol %, based on the molar amount of the reactive groups a) in the respective pulverulent material prior to the treatment.

The number of repetitions of steps i. and ii. and optionally of steps iii. and iv. in step v., also called repeat steps v., is preferably within a range from 3 to 1 000 000, or preferably within a range from 10 to 700 000, or preferably within a range from 100 to 500 000. In the repeat steps, it is possible to employ any combination of first pulverulent material and at least one further pulverulent material. It is possible that a layer of first pulverulent material alternates in each case with a layer of at least one further pulverulent material. Alternatively, it is possible for multiple layers of first pulverulent material to follow multiple layers of at least one further pulverulent material, and vice versa.

It is preferable that, within the three-dimensional object, the content of reactive groups a) to z) may vary within the repeat steps v. Preferably, the content of reactive groups a) to z) in the three-dimensional object differs between the different final materials formed by the repeat steps v. within a range from 0.1 to 40 mol %, or preferably within a range from 0.5 to 30 mol %, or preferably within a range from 1 to 20 mol %, based on the layer having the lowest content of reactive groups a) to z).

In the treatment in step ii. and optionally in step iv., preference is given to treating a portion of the pulverulent material applied in step i. or in step iii. within a range from 1% to 99%, or preferably within a range from 5% to 95%, or preferably within a range from 10% to 90%, or preferably within a range from 20% to 80%, based on the amount of pulverulent material applied in step i. or optionally in step iii. The treatment of at least a portion of the pulverulent material in step ii. and optionally in step iv. is preferably effected in a spatially resolved manner. In the context of the present invention, a spatially resolved treatment is when only a selected portion of the pulverulent material is treated. The spatially resolved treatment of this selected portion is preferably conducted with a precision in every spatial direction within a range from 0.01 to 2 mm, or preferably within a range from 0.05 to 1.5 mm, or preferably within a range from 0.1 to 1 mm. More particularly, the treatment in step ii. and optionally in step iv. is conducted when the layer of pulverulent material in step i. and optionally in step iii. is in two-dimensional form. However, even when the pulverulent material has already been applied in a spatially resolved manner in step i. and optionally in step iii., spatially resolved treatment of the pulverulent material in step ii. and optionally in step iv. is additionally possible.

Preferably, the treatment in step ii. and optionally in step iv. is conducted in an at least partly time-resolved manner. In the context of the invention, "time-resolved" is understood to mean that at least two different points in the pulverulent material applied in step i. or iii. are specifically treated at different times. Different points are understood to mean areas of the pulverulent material that have at least one distance within a range from 0.01 to 10 mm, or preferably within a range from 0.05 to 7 mm, or preferably within a range from 0.1 to 5 mm. In addition, "time-resolved" may also be understood to mean that different points in the pulverulent material applied in step i. or iii. are treated for different periods of time. Preferably, the treatment for different periods of time may be within a range from 0.00001 to 2 s, or preferably within a range from 0.00005 to 1.5 s, or within a range from 0.0001 to 1 s.

In addition, it is possible that different points in the pulverulent material applied in step i. or iii. are treated with different intensities of radiation. Preferably, the different intensity of radiation is within a range from 1 W/mm$^2$ to 1000 kW/mm$^2$, or preferably 100 W/mm$^2$ to 800 kW/mm$^2$, or preferably 1000 W/mm$^2$ to 700 kW/mm$^2$.

The layer of the final material obtained after step ii. has a thickness within a range from 0.01 to 10 mm or preferably within a range from 0.05 to 2 mm, or preferably within a range from 0.1 to 1 mm. The layer may take any form that the person skilled in the art would select for the purpose. The layer preferably has at least one coherent line of final material of the respective layer. However, it may also be a coherent two-dimensional layer of final material or a layer with cutouts.

Preferably, the first pulverulent material or the at least one further pulverulent material has a number of reactive groups a) in a ratio of 1:100 to 10:1, more preferably in a ratio of 1:10 to 5:1, or preferably in a ratio of 1:8 to 2:1, to the number of reactive groups b) to z).

Preferably, the reactive groups a) to z) of the pulverulent materials react without detachment of further molecules to form bonds selected from the group consisting of a C—C bond, a C—O bond, an N—C bond or an S—C bond or a mixture of at least two of these.

The pulverulent material preferably includes a catalyst that catalyzes the reaction of the reactive groups a) with a) to z) which is initiated by the treatment. "Catalyze" is understood to mean both the initiation and the acceleration of the respective reaction between the first reactive group a) with a further group a) or at least one of the further reactive groups b) to z). The reactive group a) and the further reactive group b) to z) may be present within one molecule of the polymer in the pulverulent material or in two different molecules. If the at least two reactive groups a) and a) to z) that react with one another are present in two different molecules of the polymer, the reaction of these two reactive groups a) and one group from a) to z) results in an increase in molar mass in the pulverulent material toward the final material. Preferably, the catalysts are selected such that the desired reactions proceed more quickly in the melt than in the powder state.

Preferred catalysts for a reaction between an isocyanate group and an isocyanate-reactive group are well known to the expert and are selected by way of example from the group consisting of tin octoate, tin dioctoate, zinc dioctoate, dibutyltin dilaurate, dimethylbis[(1-oxoneodecyl)oxy]stannane, dimethyltin dicarboxylate, zirconium bis(ethylhexanoate), zirconium acetylacetonate or tertiary amines, for example 1,4-diazabicyclo[2.2.2]octane, diazabicyclononane, diazabicycloundecane, 1,1,3,3-tetramethylguanidine, 1,3,4,6,7,8-hexahydro-1-methyl-2H-pyrimido(1,2-a) pyrimidine. The reaction of isocyanates with one another may be catalyzed by, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems known from GB 2 222 161 that consist of mixtures of tertiary bicyclic amines, for example DBU, with simple low-molecular-weight aliphatic alcohols. Likewise suitable as isocyanate trimerization catalysts are a plurality of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylenoic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex compound of titanium, zirconium and/or hafnium known from application EP 13196508.9, for example zirconium tetra-n-butoxide, zirconium tetra-2-ethylhexanoate and zirconium tetra-2-ethylhexoxide, and tin compounds of the type described in European Polymer Journal, vol. 16, 147-148 (1979), for example dibutyltin dichloride, diphenyltin dichloride, triphenylstannanol, tributyltin acetate, tributyltin oxide, tin octoate, dibutyl(dimethoxy)stannane and tributyltin imidazolate.

If the reaction of reactive groups a) to z) involves identical reactive groups, for example exclusively reactive groups a) that react with one another, it is possible in the case of di- or trimerization reactions of isocyanate groups to use catalysts as described in EP application EP 15164520.7.

Preference is given to using catalysts in an amount of >0.001% by weight and <5% by weight or preferably in an amount of >0.01% by weight <1.5% by weight, based on the total weight of the respective pulverulent material. The catalyst is preferably characterized in that it accelerates the reaction relative to the uncatalyzed reaction at least by a factor of 2, or preferably by a factor of 3, or preferably by a factor of 5.

In a preferred configuration of the process, the first pulverulent material includes an amount of reactive groups within a range from 0.1% to 25% by weight, or preferably within a range from 0.5 to 20, or preferably within a range from 1 to 15, or preferably within a range from 1.5 to 10, or preferably within a range from 1.8 to 8, based on the total weight of the respective molecule containing the reactive groups.

Preferably, the at least one further pulverulent material includes an amount of reactive groups within a range from 0.1% to 25% by weight, or preferably within a range from 0.5 to 20, or preferably within a range from 1 to 15, or preferably within a range from 1.5 to 10, or preferably within a range from 1.8 to 8, based on the total weight of the respective molecule containing the reactive groups.

If the first pulverulent material or the further pulverulent material includes more than one type of reactive groups a) and b) to z), it is preferable that the reactive groups a) to b) to z), in the construction of chemical compounds by formation of new C—O and/or C—N and/or C—S bonds, are present within a polymer molecule of the first or further pulverulent material in a ratio of 10:1 to 1:10, or preferably within a range from 5:1 to 1:5, or preferably within a range from 3:1 to 1:3. Preferably, the at least one reactive group a) have a distance of at least 8 carbon atoms from the at least one reactive group b) to z) within a polymer molecule of the first or further pulverulent material, or preferably of at least 10 carbon atoms, or preferably of at least 20 carbon atoms, or preferably within a range from 10 to 200 carbon atoms, or preferably from 15 to 150 carbon atoms, or preferably from 20 to 100 carbon atoms.

In a further preferred configuration of the process, at least one of the pulverulent materials selected from the group consisting of the first pulverulent material and the at least one further pulverulent material includes at least one first compound or a further compound having a molecular mass within a range from 100 to 200 000 g/mol. Preferably, the first and optionally the at least one further pulverulent material includes a polymer having a molecular mass within a range from 200 to 80 000 g/mol, or preferably within a range from 500 to 60 000 g/mol, or preferably within a range from 1000 to 50 000 g/mol.

The pulverulent material, especially the first and/or further pulverulent material, include the polymer within a range from 10% to 99.9% by weight, or preferably within a range from 20% to 99.5% by weight, or preferably within a range from 30% to 99.3% by weight, or preferably within a range from 40% to 99.1% by weight, or preferably within a range from 50% to 99% by weight, based on the total weight of the pulverulent material. The pulverulent material preferably includes further materials. Preferably, the pulverulent material includes a further material selected from the group consisting of catalysts, substances that absorb (IR) radiation, antiblocking agents, inhibitors, pigments, dyes, flame retardants, stabilizers against aging and weathering effects, against hydrolysis, light, heat and discoloration, plasticizers, lubricants and demolding agents, fungistatic and bacteriostatic substances, reinforcing agents and inorganic and/or organic fillers and mixtures thereof, or a combination of at least two of these.

In addition, the pulverulent material, especially the first pulverulent material, just like the further pulverulent material, may include a powder flow auxiliary such as fumed silicas (for example an Aerosil® from Evonik Industries AG), a melt leveling auxiliary, for example the commercial products Perenol® F 40, Perenol® F 30 P from BASF SE or BYK-359, BYK-360 P from BYK-Chemie GmbH, or at least two of the above.

Preferably, the treatment in step ii. or optionally in step iv. achieves a cohesive bond between the powder grains or powder particles of the treated portion of the first or further pulverulent material. Preferably, as a result of the treatment of the at least one portion of the pulverulent material in step ii. and optionally in step iv., a chemical reaction takes place between at least some of the reactive groups selected from the group consisting of a) and a), or a) and b) or b) and b), where b) may represent a multitude of different reactive groups. Preferably, the chemical reaction is the formation of a covalent bond between two preferably different atoms. Preferably, the preferably different atoms are selected from the group consisting of carbon (C), oxygen (O), nitrogen (N), phosphorus (P), sulfur (S), silicon (Si), chlorine (Cl), fluorine (F), iodine (I) or a combination of at least two of these.

In a preferred configuration of the process, at least one of the reactive groups b), preferably b) to z), is selected from the group consisting of a hydroxyl group, an amino group, a thiol group, an epoxy group, an anhydride group, a urethane group, a urea group, a carboxyl group, a carboxylate group, an isocyanate group, an ester group, a carbodiimide group, an amide group, a carboxylic acid group, an aldehyde group, a triazine group, a uretdione group, a cyclic ester group, a cyclic urethane group, a cyclic lactam group, a cyclic carbonate group, a thiuram group, or a combination of at least two of these. Here too, b) may represent a multitude of different reactive groups b) to z) and symbolizes any further reactive group that differs from the first reactive group a) or another further reactive group b). Preferably, the first pulverulent material or the at least one further pulverulent material has at least two different reactive groups a) or b). Preferably, the first pulverulent material has a different number of reactive groups a) or b) than the at least one further pulverulent material. Preferably, the first pulverulent material has at least 10%, or preferably at least 20%, or preferably at least 30%, or preferably at least 50%, of reactive groups a) or b) that differ from the reactive groups a) or b) of the at least one further pulverulent material. Preferably, the reactive groups a) and/or b) are selected such that a reactive group a) can in each case potentially react together with a reactive group b) in step ii.

In a preferred configuration of the process, the pulverulent material includes at least one first compound that includes at least the first reactive group a) and at least one further compound that includes at least the further reactive group b). The first compound may be a monomer or a polymer. The first compound preferably has at least three reactive groups, where more than 50% of the reactive groups are a reactive group a) and less than 50% of the reactive groups are a reactive group b), where the reactive groups a) and b) are chemically different than one another.

The further compound may be a monomer or a polymer. The further compound preferably has at least three reactive groups, where more than 50% of the reactive groups are a reactive group b) and less than 50% of the reactive groups are a reactive group a), where the reactive groups a) and b) are chemically different than one another.

In a preferred configuration of the process, the at least one first reactive group a) is an isocyanate group or a product from a reaction of an isocyanate group with itself or with another of the reactive groups in the compound (derivative). Preferably, the isocyanate group or derivative thereof is selected from the group consisting of a blocked isocyanate group, an unblocked isocyanate group, a urethane group, a uretdione group, a urea group, a biuret group, an isocyanurate group, a carbodiimide group, an allophanate group, an iminooxadiazinedione group and an oxadiazinetrione group or a combination of at least two of these.

In a preferred configuration of the process, the at least one further reactive group b) is an isocyanate-reactive group. Preferably, the isocyanate-reactive group is selected from the group consisting of a hydroxyl group, an amino group, a thiol group, an epoxy group, an anhydride group, a urethane group, a urea group, a carboxyl group, a carboxylate group or a combination of at least two of these.

In a preferred configuration of the process, the first pulverulent material includes the first compound in a ratio to the at least one further compound within a range from 1:200 to 200:1, or preferably within a range from 1:100 to 100:1, or preferably within a range from 1:50 to 50:1, or preferably within a range from 1:10 to 10:1, or preferably within a range from 1:5 to 5:1, or preferably within a range from 1:2 to 2:1, based on the total mass thereof.

In a preferred configuration of the process, the portion of the pulverulent material which is not treated in step ii. is still pulverulent after step ii. Preferably, the portion which is still pulverulent after treatment in step ii. is reutilizable.

In a preferred configuration of the process, the proportion of the pulverulent material treated in step ii. is within a range from 0.1% to 95% by weight, or preferably within a range from 0.5% to 90% by weight, or preferably within a range from 1% to 80% by weight, or preferably within a range from 5% to 75% by weight, or preferably within a range from 10% to 70% by weight, based on the total amount of the pulverulent material applied in step i.

In a preferred configuration of the process, the pulverulent material is treated in step ii. with the aid of a light source selected from the group consisting of an infrared laser, an infrared laser diode, a laser that emits within the visible region, a radiator that emits within the IR, visible or ultraviolet region of the electromagnetic spectrum, an electron beam source, a UV laser, a UV laser diode or a combination of at least two of these. The light from the light source is preferably focusable. Preferably, during step ii. and optionally in step iv., at a particular juncture, an area within a range from 1 $\mu m^2$ to 10 $mm^2$, or preferably within a range from 0.01 to 5 $mm^2$, or preferably within a range from 0.05 to 1 $mm^2$, is being irradiated.

In a preferred configuration of the process, the process also includes at least one of the following steps:

vii. applying an additional pulverulent material to at least a portion of the material treated in step ii. or iv. and repeating step ii.; the additional material here may either have no reactive groups or else have reactive groups selected from the group consisting of a), b) to z) or a combination of at least two of these;

viii. repeating steps i. or iii. 1 to 10 000 times, or preferably 2 to 9000 times, or preferably 5 to 8000 times, or preferably 10 to 5000 times, in any sequence, in each case in combination with step ii. or iv.;

ix. detaching the three-dimensional object from the surface of the substrate;

x. removing and optionally recycling the pulverulent material not treated in step ii. or in step iv. from the three-dimensional object;

xi. heat-treating the three-dimensional object at a temperature within a range from 100 to 350° C., or preferably within a range from 120 to 300° C., or preferably within a range from 130 to 250° C., preferably for a period within a range from 1 to 600 minutes, or preferably within a range from 5 to 500 minutes, or preferably within a range from 10 to 400 minutes;

xii. removing of the pulverulent material not treated in step ii. or optionally in step iv.

The invention further relates to a component obtainable by a process as described above. The component or constituents of the component have the properties, materials, dimensions and shapes as described above for the process.

The present invention further relates to a pulverulent material including at least one first compound including a first reactive group a) and at least one further compound including a further reactive group b), where the pulverulent material is suitable for use in the process of the invention as described above. The properties, amounts, compositions and functionalities of the first compound and of the at least one further compound are preferably the same as described for the respective compounds in connection with the different pulverulent materials for the process of the invention. Preferably, the particles of the first and preferably of all further pulverulent materials have at least the following properties:

Include at least 10% by weight of the particles both of the first compound and of one of the at least one further compound;

Each particle includes at least 10% by weight, preferably at least 30% by weight, or preferably at least 50% by weight, of the first compound;

Each particle includes at least 10% by weight, preferably at least 30% by weight, or preferably at least 50% by weight, of one of the at least one further compound;

The average particle size of the powder is within a range from 1 to 1000 μm, preferably 2 to 500 μm and more preferably 5 to 200 μm, determined by, for example, dynamic light scattering or counting of the particle sizes under a light microscope.

In a preferred configuration of the pulverulent material, the first compound has a melting temperature that differs from the melting temperature of the at least one further compound by not more than 50° C., preferably not more than 40° C., or preferably not more than 30° C. Preferably, the different compounds are mixed in the powder grains of the respective pulverulent material, for example of the first pulverulent material.

In a preferred configuration of the pulverulent material, at least one of the compounds selected from the first or one of the further compounds or more than one of the further compounds is soluble in the melt of at least one of the other compounds. Preferably, the first compound is in the form of a separate powder on the surface of the powder grain of the at least one further compound.

In a preferred configuration of the pulverulent material, the first compound and the at least one further compound have a proportional mixed melting temperature that differs from the melting temperature of the first compound and the melting temperature of the respective further compound by at least 2° C. in each case, preferably by at least 3° C., or preferably by at least 5° C., or preferably by at least 10° C., or preferably differs from the melting temperature within a range from 1 to 150° C., or preferably within a range from 2 to 100° C., or preferably within a range from 3 to 70° C., or preferably within a range from 4 to 50° C.

EXPERIMENTAL

Comparative Example 1: Laser Sintering of Pure TPU Powder (Luvosint X92A-1)

The commercially available laser sinter powder Luvosint® X92A-1 (from Lehmann&Voss&Co) based on thermoplastic polyurethane having a Shore A hardness of 92 was processed in a Sharebot SnowWhite laser sintering system. For this purpose, the powder was filled uniformly into the powder application vessel and a powder bed was created. The construction space was not heated; instead, the required energy was introduced purely via the laser. The laser power was 40%; this corresponds to 5 W. The beam was guided over the powder bed in the form of a cross (double exposure) at a scan rate of 1600 mm/s and a hatch distance of 0.1 mm. The beam diameter of the laser used was about 0.1 mm, as usual for the laser in the Sharebot SnowWhite laser sintering system used. The intensity of the radiation was thus in the region of 640 W/mm$^2$.

Example 1: Laser Sintering of TPU Powder in Combination with Micronized IPDI Trimer The commercially available laser sinter powder Luvosint® X92A-1 (from Lehmann&Voss&Co) based on thermoplastic polyurethane with a Shore A hardness of 92 was mixed with micronized IPDI trimer (Desmodur® Z, Covestro, cf. also EP2159238A1) in a ratio of 90:10 percent by weight at room temperature (i.e. without melting the materials). For this purpose, a corresponding weight ratio of the substances was weighed out and mixed together intimately in a tumble mixer filled to an extent of 30% at 30 rpm and for 60 min. This was sintered with the same process parameters as the pure TPU powder in comparative example 1 in the Sharebot SnowWhite. By comparison with the pure TPU powder, somewhat greater shrinkage occurs in the laser sintering.

Small platelets of diameter 20 mm and a powder layer (about 0.2 mm) thickness were sintered with the abovementioned parameters, firstly composed of pure TPU according to comparative example 1 and of a mixture of 90% by weight of TPU and 10% by weight of micronized IPDI according to example 1. The sintered platelets were then examined for their melt viscosity and their storage modulus in a rheometer (TA Instruments ARES) in oscillation. The measurement frequency was 1 Hz, the measurement temperature 170° C. and the shear rate 1/s. The table below lists the values after measurement time 2 minutes.

| Example | % by weight of TPU | % by weight of IPDI | Viscosity | Storage modulus G' |
| --- | --- | --- | --- | --- |
| Comparative example 1 | 100 | 0 | 1200 Pa · s | 1000 Pa |
| Example 1 | 90 | 10 | 3000 Pa · s | 7600 Pa |

A distinct difference is apparent both in viscosity and in storage modulus G' between the pure TPU sample and the mixture with 10% by weight of IPDI powder: the viscosity rises by a factor of 2.5 with IPDI and G' by a factor of about 7.5 compared to the pure TPU sample. Both pairs of values suggest crosslinking of the TPU by the added IPDI.

In addition, a dynamic-mechanical analysis in shear according to DIN EN ISO 6721-1 was conducted on sintered specimens. The glass transition temperature, ascertained from a maximum of the loss modulus curve, is −17° C. for the pure TPU sample. In the case of the mixture of 90% by weight of TPU and 10% by weight of IPDI trimer, a glass transition temperature of −6° C. is ascertained. The shift in the glass transition temperature to higher values and also the rise in the modulus G' are signs of an increase in molecular weight and/or crosslinking of the material during the sintering process.

The invention claimed is:

1. A process for producing a three-dimensional object, comprising: performing powder-based additive manufacturing with a first pulverulent material including a first compound having a first reactive group a) and at least one further pulverulent material, wherein the first reactive group a) of the first pulverulent material is selected from the group consisting of an isocyanate group, a blocked isocyanate group, and a mixture thereof, and wherein the average molecular mass of the first pulverulent material is lower than the average molecular mass of the at least one further pulverulent material.

2. The process as claimed in claim 1, further comprising:
   i. providing the first pulverulent material on at least part of a surface, wherein the first compound includes the first reactive group a) and a further reactive group b);
   ii. optionally treating at least part of the first pulverulent material;
   iii. optionally applying the at least one further pulverulent material, where the at least one further pulverulent material includes a further compound, wherein the further compound optionally includes the first reactive group a), optionally includes a further reactive group b), or both;

iv. treating at least part of the pulverulent material applied in step i., treating at least part of the at least one further pulverulent material applied in step iii., or both;

v. repeating steps i. to iv. at least three times with the first pulverulent material, the at least one further pulverulent material, or both to obtain the three-dimensional object;

vi. optionally thermally or chemically aftertreating the object obtained;

wherein, in the treatment in step ii. and optionally in step iv., in a treated part of the first pulverulent material and of any at least one further pulverulent material, at least some of the reactive groups a) and optionally further reactive groups b) react among one another, with one another, or both to obtain a final material.

3. The process as claimed in claim 2, wherein, in the treatment in steps ii., iv., or both, a G' modulus of at least one treated pulverulent material increases by at least 100% compared to a G' modulus of the respectively untreated pulverulent material.

4. The process as claimed in claim 1, wherein the first pulverulent material contains an amount of reactive groups within a range from 0.1% to 25% by weight, based on the total weight of the respective compound containing the reactive groups.

5. The process as claimed in claim 2, wherein at least one of the pulverulent materials includes the first compound or the further compound having a molecular mass within a range from 100 to 200 000 g/mol.

6. The process as claimed in claim 2, wherein the further reactive group b) is selected from the group consisting of a hydroxyl group, an amino group, a thiol group, an epoxy group, an anhydride group, a urethane group, a urea group, a carboxyl group, a carboxylate group, a carboxylic acid group, an isocyanate group, an ester group, a carbodiimide group, an amide group, an aldehyde group, a triazine group, a uretdione group, a cyclic urethane group, a cyclic lactam group, a cyclic carbonate group, a thiuram group, and a combination of at least two of these.

7. The process as claimed in claim 2, wherein the first pulverulent material and the at least one further pulverulent material include the first compound including the first reactive group a) and the further compound including the further reactive group b).

8. The process as claimed in claim 1, wherein the first reactive group a) comprises an isocyanate group or a derivative thereof selected from the group consisting of a blocked isocyanate group, an unblocked isocyanate group, a urethane group, a uretdione group, a urea group, a biuret group, an isocyanurate group, a carbodiimide group, an allophanate group, an iminooxadiazinedione group an oxadiazinetrione group, and a combination of at least two of these.

9. The process as claimed in claim 2, wherein the further reactive group b) is an isocyanate-reactive group selected from the group consisting of a hydroxyl group, an amino group, a thiol group, an epoxy group, an anhydride group, a urethane group, a urea group, a carboxylic acid group, a carboxylate group, and a combination of at least two of these.

10. The process as claimed in claim 2, wherein the first pulverulent material includes the first compound in a ratio to the further compound within a range from 1:200 to 200:1, based on the total mass thereof.

11. The process as claimed in claim 2, further comprising:

vii. applying an additional pulverulent material to at least part of the material treated in step ii. or iv. and repeating step ii.;

viii. repeating step i. or iii. 1 to 10 000 times in any sequence, in each case in combination with step ii. or iv.;

ix. detaching the three-dimensional object from the surface of a substrate;

x. removing and optionally recycling the pulverulent material not treated in step ii. or in step iv. from the three-dimensional object;

xi. heat-treating the three-dimensional object at a temperature within a range from 100 to 350° C.

* * * * *